Oct. 22, 1946.   R. M. STRONG   2,409,911
CONTROL SYSTEM
Filed March 23, 1945
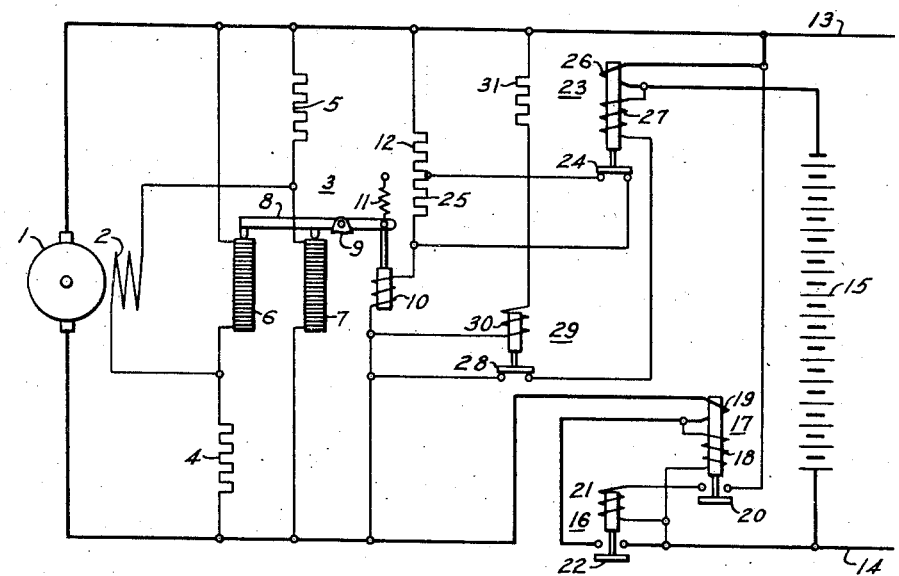
WITNESSES:
INVENTOR
Robert M. Strong.
BY
ATTORNEY

Patented Oct. 22, 1946

2,409,911

UNITED STATES PATENT OFFICE 2,409,911

CONTROL SYSTEM

Robert M. Strong, Wilkinsburg, Pa., assignor to Westinghouse Electric Corporation, East Pittsburgh, Pa., a corporation of Pennsylvania Application March 23, 1945, Serial No. 584,365

8 Claims. (Cl. 320—22)

1

The present invention relates to battery-charging systems and, in particular, to such systems of the type used on railway cars, and other types of vehicles.

The electrical systems used on railway passenger cars for supplying the air-conditioning equipment, lights, and other loads include an axle-driven generator and a battery, which supplies the load when the car is standing still or moving at low speeds. At higher speeds, when the generator voltage is high enough to supply the load, the battery is floated across the line and is charged by the generator. In order to charge the battery at a high rate, and yet avoid the danger of overcharging, with resultant gassing and damage to the battery, it has been found desirable to utilize a two-voltage constant-potential system. In such a system, a relatively high voltage is applied to the battery for charging and, when it is fully charged, or almost fully charged, the voltage is reduced to a safe value for floating the battery across the line.

A two-voltage system of this type is disclosed and claimed in a patent to D. W. Exner, No. 2,165,040, issued July 4, 1939, and assigned to the Westinghouse Electric & Manufacturing Company. In this system, the voltage is controlled by a so-called battery-taper relay which operates to change the setting of the generator voltage regulator. This taper relay is designed to pick up and effect an increase in the voltage applied to the battery when the charging current flowing to the battery exceeds a predetermined value, and to drop out and reduce the voltage when the charging current has decreased to a lower predetermined value. This system, therefore, utilizes the magnitude of the charging current as an indication of the state of charge of the battery, to determine when the higher voltage should be applied to the battery for charging, and when the voltage should be reduced. In batteries of the lead-acid type, the back E. M. F. of the battery is low when the battery is discharged and increases as the battery is charged. Thus, the battery will take a large charging current when it is discharged and if a constant charging voltage is applied to the battery, the increasing back E. M. F. causes the charging current to decrease as the battery becomes more fully charged. The magnitude of the charging current can therefore be relied on as an indication of the state of charge of the battery, and the system of the Exner patent works well and is in successful use with batteries of the lead-acid type.

In the case of batteries of the Edison or alkaline type, however, the back E. M. F. of the battery is a function of the rate at which the battery has been charged, as well as of the state of charge. Thus, an Edison battery which has been charged to a given percentage of full charge at a low rate will take a much lower charging current at a given voltage than a similar battery which has been charged to the same percentage of full charge at a higher rate. With batteries of the Edison type, therefore, the current cannot be relied on as an indication of the state of charge of the battery, and the system described above is not entirely satisfactory for use with Edison batteries, since the effect of the rate of charge on the magnitude of the charging current may result in failure of the taper relay to operate in the desired manner.

For example, assume that a car equipped with an Edison battery and with a taper relay of the type described above has been standing still with a heavy load, such as the air-conditioning load, on the battery for a long enough time to discharge the battery. If the car now starts to move with the air-conditioning load still on, the generator output will be limited by the load-limit equipment with which axle-driven generators are usually provided, which limits the maximum load current by reducing the generator voltage. The battery will therefore be charged at a low rate, because of the low generator voltage. If the air-conditioning load is now removed, when the battery is partially charged, the generator voltage will rise to its normal lower value. Since the battery is only partly charged, the taper relay should now operate to increase the generator voltage to its higher value, to charge the battery. The Edison battery has been partially charged at a low rate, however, and it will not take a large enough charging current at the lower generator voltage to operate the taper relay. The battery will, therefore, continue to be charged at a low rate, so that an excessively long time is required to fully charge the battery, and, if frequent starts and stops occur, the battery will never be fully charged. This condition cannot be overcome by setting the taper relay to pick up and raise the voltage at a lower value of charging current, because it would then drop out at a value of current which would be too low to protect a battery which had been initially charged at a high rate from overcharging.

The principal object of the present invention is to provide a battery-charging system in which a relatively high voltage is applied to the battery for charging it at a high rate, irrespective of the value of charging current taken by the battery, so that the charging current is not relied on as an indication of the initial state of charge of the battery.

A further object of the invention is to provide a battery-charging system especially adapted for use with batteries of the Edison or alkaline type, in which a taper relay is used which is actuated to cause a relatively high voltage to be applied to the battery for charging, irrespective of the initial value of charging current flowing to the battery, and in which the relay operates to reduce the voltage to a safe value for floating the battery across the line when the current has decreased to a value indicating that the battery is fully charged, or almost fully charged.

Other objects and advantages of the invention will be apparent from the following detailed description, taken in connection with the accompanying drawing, the single figure of which is a schematic wiring diagram showing a preferred embodiment of the invention.

The invention is shown in the drawing as applied to a railway-car system which includes a generator 1 of any suitable type which is driven from the car axle, and which has a field winding 2. The voltage of the generator is controlled by a voltage regulator 3 which may be of any suitable type. The particular voltage regulator shown in the drawing for the purpose of illustration consists of two fixed resistors 4 and 5 and two variable resistors 6 and 7, which are connected in a bridge circuit across the terminals of the generator 1. The field winding 2 of the generator is connected, as shown, across the diagonal of the bridge circuit, and it will be apparent that by varying the resistances of the variable resistors 6 and 7, the current in the field winding 2 can be varied over a wide range, in order to maintain constant, or substantially constant, generator voltage over a wide range of generator speed. The resistors 6 and 7 have been shown as carbon-pile resistors, the resistances of which may be varied simultaneously by means of a pressure member 8, which is pivoted at 9 and actuated by means of a coil 10 acting in opposition to a spring 11. The voltage regulator coil 10 is connected across the generator 1 in series with a resistor 12, and it will be seen that a change in the generator voltage will cause movement of the pressure member 8 about its pivot to increase or decrease the resistance of the resistors 6 and 7, and thus change the field current in the winding 2 to bring the generator voltage back to the desired value, the magnitude of the voltage being determined by the resistance of the resistor 12.

The generator 1 is connected to the line 13, 14 which supplies the electrical loads on the car, such as air-conditioning equipment, lights, etc., and a battery 15 is connected across the line 13, 14 to be charged by the generator, and to supply the load when the car is at a standstill, or moving at low speed. The generator 1 is connected to the line through a contactor 16 which may be controlled by a reverse-current relay 17. The reverse-current relay 17 may be of any suitable or usual type, and has been shown diagrammatically as having a voltage coil 18, which is connected to be responsive to the voltage difference between the generator and the battery, and a current coil 19, which is connected in series in the line. The relay 17 operates in the usual manner, to close its contact 20 when the generator voltage exceeds the battery voltage, and thus energize the operating coil 21 of the contactor 16 to cause it to close its contact 22 and connect the generator to the line. When the generator voltage falls below the battery voltage, so that reverse current flows from the battery to the generator, the current coil 19 causes the relay 17 to open its contact 20 and thus permit the contactor 16 to drop out and disconnect the generator from the line.

As previously explained, it is desirable to charge the battery 15 at a relatively high rate by applying a high voltage to it for charging, and to reduce the voltage when the battery is fully charged, or almost fully charged, to a lower value at which the battery can safely be floated across the line. For this purpose, a battery-taper relay 23 is provided. The relay 23 has a normally closed contact 24 which, as shown in the drawing, short-circuits a portion 25 of the resistor 12 in series with the voltage regulator coil 10. The relay 23 has a series, or current, coil 26 connected in series with the battery 15, so as to carry the battery current, and it also has a shunt, or voltage, coil 27, which may be energized either by the battery voltage or by the generator voltage, which is shown as being connected across the line in series with the normally closed contact 28 of a voltage relay 29.

The voltage relay 29 has a coil 30 connected across the generator voltage, preferably in series with a resistor 31. The contact 28 of the relay 29 is normally closed, and the relay 29 is designed to pick up and open its contact 28 at a voltage which is above the normal lower value of generator voltage and which should be close to the higher value of generator voltage, that is, the voltage which is to be applied to the battery for charging. The characteristics of the voltage relay 29 are such that when it has picked up and opened its contact 28, it will remain in that position until the voltage across the coil 30 has fallen to a value considerably lower than that which caused the relay to operate, and which must be lower than the normal lower value of generator voltage.

The operation of this system is as follows: Since the contact 28 of the voltage relay 29 is normally closed, the shunt coil 27 of the taper relay 23 is normally connected across the line and is energized by the generator voltage. The coil 27 is designed to cause the relay 23 to pick up and open its contact 24 without the assistance of the series coil 26, so that the relay is actuated independently of the value of the battery current flowing through the coil 26. Thus, if the car has been standing still and then starts up, the shunt coil 27 will be energized from the generator 1 and, as soon as the generator voltage has increased to a high enough value, which is still below the normal battery voltage, the relay 23 picks up and opens the contact 24. Opening of the contact 24 removes the short-circuit around the resistor 25 and inserts this resistance in series with the voltage regulator coil 10, thus changing the setting of the voltage regulator to a higher voltage. The generator voltage, therefore, will come up to a relatively high value to charge the battery 15 at a high rate. The reverse-current relay 17 causes the contactor 16 to close as soon as the generator voltage exceeds the battery voltage, and the generator then charges the battery at the high rate. As the generator voltage approaches its higher value, the relay 29 opens its contact 28 to deenergize the shunt coil 27 of the taper relay 23. At the high charging voltage, however, the battery 15 will take a relatively high current, irrespective of the rate at which it has previously been charged, and this current flowing in the series coil 26 is sufficient to maintain the taper relay 23 in its actuated position with the contact 24 open, so that the generator voltage remains at its higher value.

As the battery 15 is charged, the charging current decreases, and when the battery is fully charged, or almost fully charged, the current has decreased to such a low value that the series coil 26 will no longer hold the taper relay 23 in its actuated position, and it drops out and closes the contact 24, short-circuiting the resistor 25. This changes the voltage-regulator setting, and reduces the generator voltage to its lower value at which the battery can safely float across the line. The voltage relay 29, however, does not drop out at this time, since the normal lower value of generator voltage is still high enough to hold it in its actuated position with the contact 28 open, and the shunt coil 27 of the taper relay 23, therefore, remains deenergized. The contact 28 of the relay 29 remains open until the generator voltage drops to a still lower value, such as occurs when the car stops or slows down to a very low speed. When this occurs, the generator voltage drops below the battery voltage and the reverse-current relay 17 causes the contactor 16 to drop out and disconnect the generator 1 from the line. The voltage across the coil 30 then becomes too low to hold the voltage relay 29 open, and it drops out and closes its contact 28, so as to reconnect the shunt coil 27 of the taper relay 23 across the line in readiness to actuate the taper relay in the manner described above, as soon as the generator voltage rises again.

Thus, the battery 15 is always charged at a high rate, since the high charging voltage is applied to it irrespective of the value of the initial charging current which the battery would take. This result is accomplished by the use of the voltage relay 29 which effects actuation of the taper relay 23 to apply the high charging voltage to the battery independently of the value of the battery current. The taper relay then operates to reduce the voltage when the current has fallen to a value which indicates that the battery is sufficiently charged. Of course, if there is a heavy load on the system when the taper relay 23 opens its contact, the load-limit device which is customarily provided to protect axle-driven generators, if used, will reduce the voltage to limit the generator load current, but since the relay 23 has already operated to raise the voltage regulator setting, the generator voltage will rise to its higher value to charge the battery as soon as the load-limit device permits. A two-voltage system is, therefore, provided which can satisfactorily be used with batteries of the Edison type in which the back E. M. F. is not a function solely of the state of charge, and the difficulties encountered in the use of prior types of two-voltage battery-charging systems with Edison batteries are avoided.

It should now be apparent that a battery-charging system has been provided which is especially adapted for use with batteries of the Edison type and which has many advantages resulting from its simplicity and reliability. It is to be understood that the particular embodiment shown and described is merely illustrative of the invention, and that various modifications and changes might be made. The invention is not limited, therefore, to the particular arrangement shown, but in its broadest aspects includes all equivalent modifications and embodiments which come within the scope of the appended claims.

I claim as my invention:

1. A battery-charging system comprising a variable-voltage source of direct current, voltage-regulating means for said source, means for connecting a battery to said source, relay means for controlling said voltage-regulating means to change the voltage applied to the battery, and means independent of the charging current flowing to the battery for effecting operation of said relay means to cause a relatively high voltage to be applied to the battery for charging, said relay means being adapted to effect a reduction in the voltage applied to the battery in response to decrease in the battery-charging current below a predetermined value.

2. A battery-charging system comprising a variable-voltage source of direct current, voltage-regulating means for said source, means for connecting a battery to said source, relay means for controlling said voltage-regulating means to change the voltage applied to the battery, said relay means having an actuated position in which it causes a relatively high voltage to be applied to the battery for charging and having a non-actuated position in which it causes a lower voltage to be applied to the battery, and means independent of the charging current flowing to the battery for effecting operation of said relay means to its actuated position, the relay means being adapted to return to its non-actuated position in response to decrease in the battery charging current below a predetermined value.

3. A battery-charging system comprising a variable-voltage source of direct current, voltage-regulating means for said source, means for connecting a battery to said source, relay means for controlling said voltage-regulating means to change the voltage applied to the battery, said relay means having an actuated position in which it causes a relatively high voltage to be applied to the battery for charging and having a non-actuated position in which it causes a lower voltage to be applied to the battery, the relay means having operating means including a series coil energized in response to the battery current and a shunt coil energized in response to a voltage of the system, and means independent of the battery current for effecting energization of said shunt coil, the shunt coil being adapted to cause operation of the relay means to its actuated position and being denergized in response to operation of the relay means, and said series coil being capable of maintaining the relay means in its actuated position when the battery current is above a predetermined value, the series coil permitting the relay means to return to its non-actuated position when the battery current decreases below said value.

4. A battery-charging system comprising a variable-voltage source of direct current, voltage-regulating means for said source, means for connecting a battery to said source, relay means for controlling said voltage-regulating means to change the voltage applied to the battery, said relay means having an actuated position in which it causes a relatively high voltage to be applied to the battery for charging and having a non-actuated position in which it causes a lower voltage to be applied to the battery, the relay means having operating means including a series coil energized in response to the battery current and a shunt coil energized in response to a voltage of the system, a voltage relay for controlling the energization of said shunt coil, said voltage relay being adapted to effect energization of the shunt coil independently of the battery current, the shunt coil being capable, when energized, of causing operation of the relay means to its actuated position, and said voltage relay being adapted to effect deenergization of the shunt coil when the voltage of the source rises to a value near its higher value, said series coil being capable of maintaining the relay means in its actuated position when the battery current is above a predetermined value, the series coil permitting the relay means to return to its non-actuated position when the battery current decreases below said value.

5. A battery-charging system comprising a variable-voltage source of direct current, voltage-regulating means for said source, means for connecting a battery to said source, relay means for controlling said voltage-regulating means to change the voltage applied to the battery, said relay means having an actuated position in which it causes a relatively high voltage to be applied to the battery for charging and having a non-actuated position in which it causes a lower voltage to be applied to the battery, the relay means having operating means including a series coil energized in response to the battery current and a shunt coil energized in response to a voltage of the system, a voltage relay responsive to the voltage of said source for controlling the energization of said shunt coil, said voltage relay being normally in position to effect energization of the shunt coil, and the shunt coil being capable, when energized, of causing operation of the relay means to its actuated position, said voltage relay being adapted to effect deenergization of the shunt coil when the voltage of the source rises to a value near its higher value and to keep the shunt coil deenergized until the voltage of the source drops below its normal lower value, said series coil being capable of maintaining the relay means in its actuated position when the battery current is above a predetermined value, the series coil permitting the relay means to return to its non-actuated position when the battery current decreases below said value.

6. Control means for a battery-charging system which includes a variable-voltage source of direct current, a voltage regulator for said source and a battery connected to the source, said control means comprising a battery-taper relay for controlling the voltage applied to the battery, and means independent of the battery current for effecting actuation of the taper relay to cause a relatively high voltage to be applied to the battery for charging, said taper relay including current-responsive means responsive to the battery current for maintaining the taper relay in its high-voltage position when the battery current is above a predetermined value and for permitting the taper relay to effect a reduction in the voltage applied to the battery when the battery current decreases below said value.

7. Control means for a battery-charging system which includes a variable-voltage source of direct current, a voltage regulator for said source and a battery connected to the source, said control means comprising a battery-taper relay for controlling the voltage applied to the battery, said taper relay having a shunt coil responsive to a voltage of the system, and means independent of the battery current for effecting energization of said shunt coil to actuate the taper relay to cause a relatively high voltage to be applied to the battery for charging, said taper relay also having a current coil energized in response to the battery current, said current coil being adapted to maintain the taper relay in its high-voltage position when the battery current is above a predetermined value and to permit the taper relay to effect a reduction in the voltage applied to the battery when the battery current decreases below said value.

8. Control means for a battery-charging system which includes a variable-voltage source of direct current, a voltage regulator for said source and a battery connected to the source, said control means comprising a battery-taper relay for controlling the voltage applied to the battery, said taper relay having a shunt coil responsive to a voltage of the system, and a voltage relay responsive to the voltage of said source for controlling the energization of said shunt coil, said shunt coil being adapted, when energized, to actuate the taper relay to cause a relatively high voltage to be applied to the battery for charging, said voltage relay being adapted to effect deenergization of the shunt coil at a voltage approaching said high voltage, and said taper relay also having a current coil energized in response to the battery current, said current coil being adapted to maintain the taper relay in its high-voltage position when the battery current is above a predetermined value and to permit the taper relay to effect a reduction in the voltage applied to the battery when the battery current decreases below said value.

ROBERT M. STRONG